United States Patent
Ferri

(10) Patent No.: US 8,820,443 B2
(45) Date of Patent: Sep. 2, 2014

(54) ALL IN ONE TOWING SOLUTION

(71) Applicant: Henry George Ferri, Stella, NC (US)

(72) Inventor: Henry George Ferri, Stella, NC (US)

(*) Notice: Subject to any disclaimer, the term of this patent is extended or adjusted under 35 U.S.C. 154(b) by 0 days.

(21) Appl. No.: 13/973,735

(22) Filed: Aug. 22, 2013

(65) Prior Publication Data

US 2014/0054098 A1    Feb. 27, 2014

Related U.S. Application Data

(60) Provisional application No. 61/692,337, filed on Aug. 23, 2012.

(51) Int. Cl.
*B62D 59/04* (2006.01)
*B62D 63/06* (2006.01)
*B62D 53/08* (2006.01)

(52) U.S. Cl.
CPC ............... *B62D 59/04* (2013.01); *B62D 63/06* (2013.01); *B62D 53/0864* (2013.01)
USPC ........................................ 180/14.2; 180/14.6

(58) Field of Classification Search
CPC ..... B62D 59/04; B62D 63/06; B62D 53/0864
USPC ................................................ 180/14.2, 14.6
See application file for complete search history.

(56) References Cited

U.S. PATENT DOCUMENTS

| 5,330,020 | A  | * | 7/1994  | Ketcham        | 180/14.2 |
|-----------|----|---|---------|----------------|----------|
| 6,419,037 | B1 | * | 7/2002  | Kramer et al.  | 180/14.2 |
| 7,118,513 | B2 | * | 10/2006 | Stummer        | 477/2    |
| 7,743,859 | B2 | * | 6/2010  | Forsyth        | 180/65.1 |
| 8,141,667 | B2 | * | 3/2012  | Shepard et al. | 180/14.1 |
| 8,365,849 | B2 | * | 2/2013  | Bartel         | 180/14.2 |

* cited by examiner

*Primary Examiner* — Kevin Hurley

(57) ABSTRACT

An all in one towing solution provides its own drive train. The drive train of the trailer is matched to an ECU and engine of a lead vehicle which communicate to ensure that the drive axle of both the lead vehicle and the trailer rotate at the same speed. The trailer is connected to a lead vehicle by an attachment system, which utilizes trailer tongues and a latching mechanism such as ball hitches. The main body of the trailer is built from a hollow base and a plurality of bulkheads, which form storage compartments for the present invention. The main body additional provides tow points for towing a larger or heavier cargo that may require specialized connections, such as a fifth wheel coupling. The present invention allows common family sedans and other commuter vehicles to tow loads that would otherwise require vehicles with sufficient power and suspension.

20 Claims, 15 Drawing Sheets

ALL IN ONE TOWING SOLUTION

The current application claims a priority to the U.S. Provisional Patent application Ser. No. 61/692,337 filed on Aug. 23, 2012.

FIELD OF THE INVENTION

The present invention relates generally to a trailer. More specifically, the present invention is a solution which provides a platform for attaching any type of trailer hitch, provides the modular space for insertion of the engine and drive train, and provides the space for insertion of storage units of various designs. The engine and drive train are linked to the ECU of a lead vehicle to ensure that the power output of the trailer matches the power output of the lead vehicle.

BACKGROUND OF THE INVENTION

Often used for travel, vacation and commercial purposes, trailers are owned by many people across the United States and the world. Trailers come in a variety of sizes and layouts, each varying with the intended purpose of the trailer. Current products on the market may provide several apparatuses for trailer hitch attachment, but lack further capabilities.

For example, trailers require a lead vehicle to be capable of towing the full weight of the trailer. Often times, this requires ownership of a pickup truck and the corresponding bed space for mounting a fifth wheel coupling. While some people choose to install a fifth wheel coupling, doing so takes up much of the storage space in the truck bed. If a ball hitch is used, the vehicle must have sufficient power to pull the trailer. For many people powerful vehicles capable of towing loads are purchased as a secondary vehicle, incurring additional costs in the form of taxes, fees, and gas resulting from decreased fuel economy when compared to smaller and less powerful sedans. Furthermore, due to daily use of a trailer capable vehicle, wear and tear may require the vehicle to be replaced in as little as three years, a significant future expense.

It is an object of the present invention to supply an all in one towing solution which provides a platform for attaching any type of trailer hitch, provides sufficient power to tow any legal weight trailer, is in communication with a lead vehicle to match the tow vehicle power output to the trailer power output, and provides storage compartments as part of the trailer. It is a further object of the present invention to provide an all in one towing solution with a lifespan of thirty years, as it is only used when towing. It is an additional object of the present invention to eliminate the higher operating costs incurred by using a towing vehicle as a daily driver. It is a further object of the present invention to eliminate the need to purchase a truck and install a fifth wheel or gooseneck trailer, to minimize the high costs and wasted fuel resulting in driving a tow vehicle when not towing, and to reduce stress and related expensed resulting from operating tow vehicles without external aids such as the present invention.

The present invention introduces a safe system capable of towing all types of trailers and affording a user newfound scales of economy as there is no need to purchase a special tow vehicle or pay the costs of higher fuel consumption when not towing. In addition, the storage capacity expands the range of trips, minimizing or eliminating the need to refuel and resupply during extended trips, whether for commercial or business purposes.

DETAIL DESCRIPTIONS OF THE INVENTION

Figure 1:
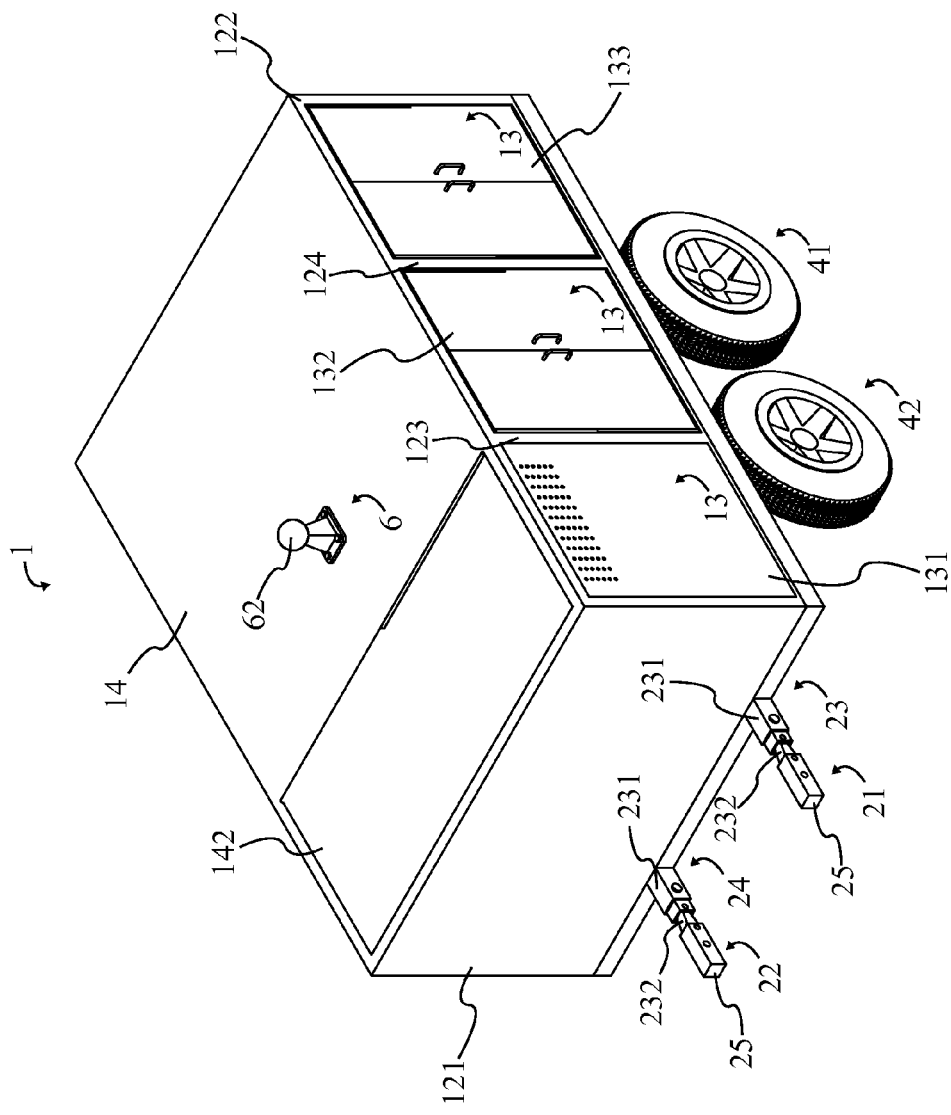
FIG. 1 is a top perspective view of the present invention.

All illustrations of the drawings are for the purpose of describing selected versions of the present invention and are not intended to limit the scope of the present invention.

The present invention is an all in one towing solution which increases the towing capacity of a lead vehicle 7. The present invention comprises a main body 1, a vehicle attachment system 2, a power train 3, a wheel system 4, a suspension 5, and a tow mount hitch 6. The main body 1 forms the core of the present invention, with support being provided by the wheel system 4 and the suspension 5, which connects the main body 1 to the wheel system 4. Power is provided by the power train 3, which is housed within the main body 1. A vehicle attachment system 2 is connected to the front of the main body 1 and allows the present invention to be coupled to a lead vehicle 7. To ensure the power train 3 matches the output of the lead vehicle's 7 engine, the power train 3 is communicably coupled to the electronic control unit (ECU) 71 of the lead vehicle 7. This allows the power train 3 to match power output 33 to that of the lead vehicle 7. A tow mount hitch 6 is connected to the main body 1. The tow mount hitch 6 serves as an intermediate connection between the lead vehicle 7 and a secondary trailer, allowing the lead vehicle 7 to tow loads for which it might otherwise lack the power, appropriate connections, or both.

Figure 2:
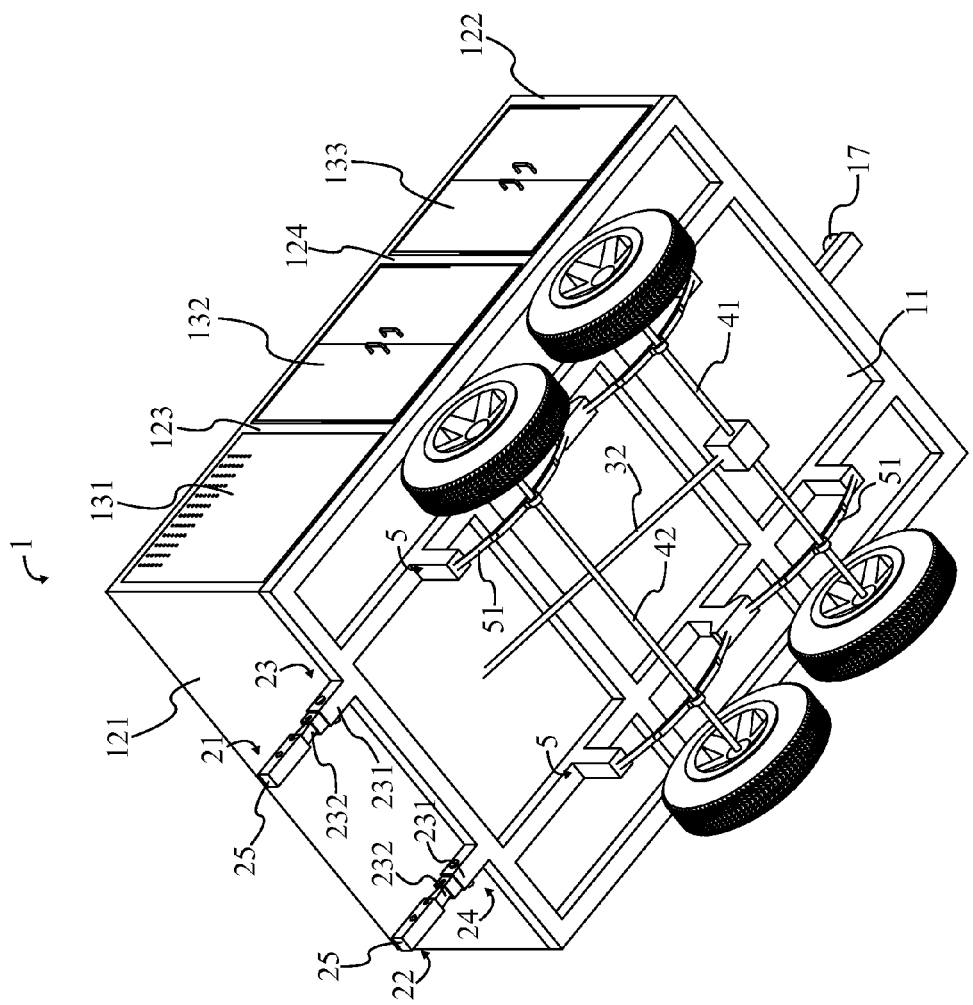
FIG. 2 is bottom perspective view of the present invention.
Figure 3:
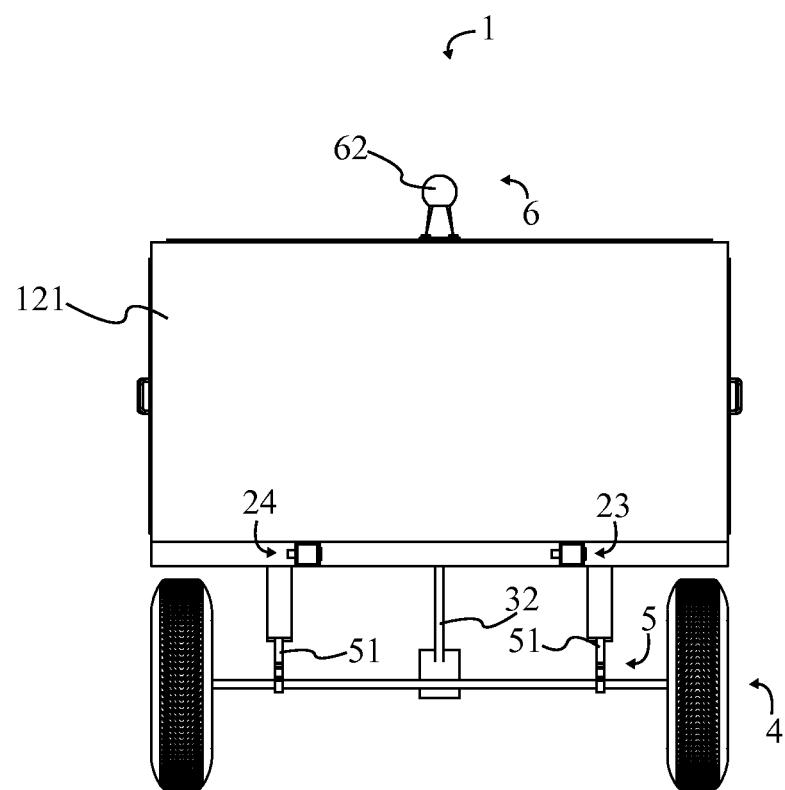
FIG. 3 is a front view of the present invention.
Figure 4:
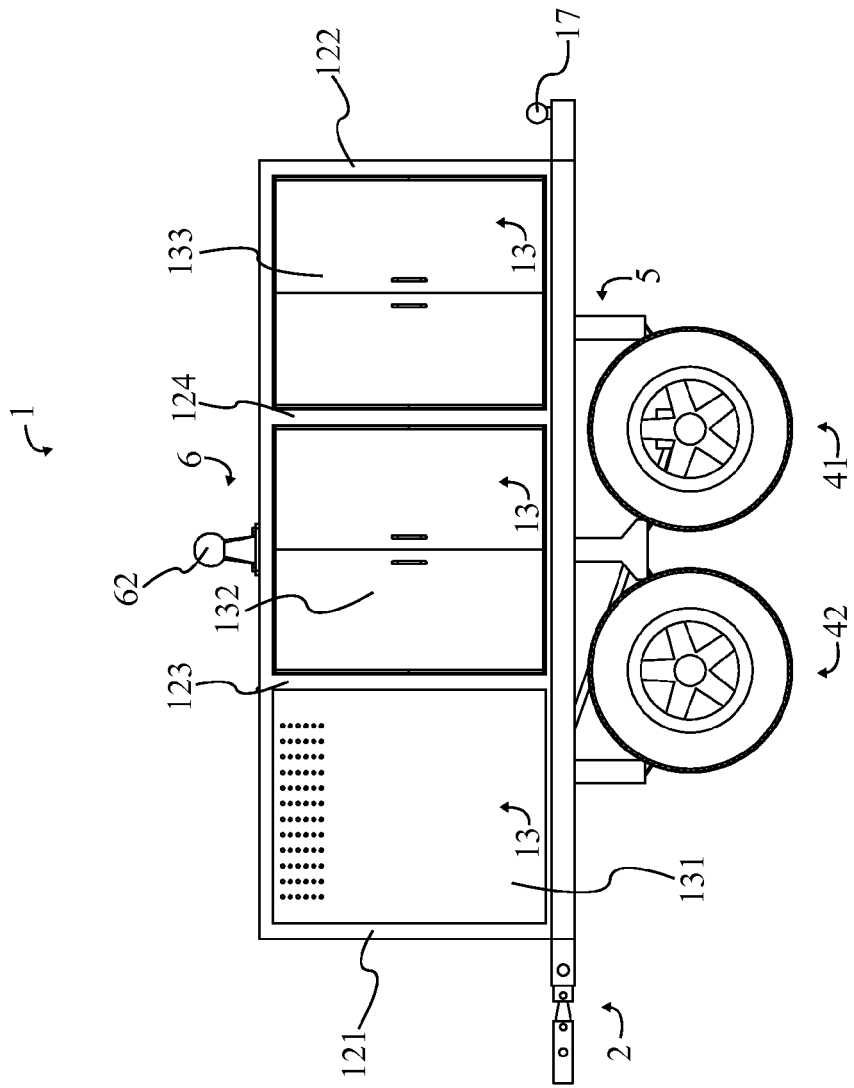
FIG. 4 is a side view of the present invention.
Figure 5:
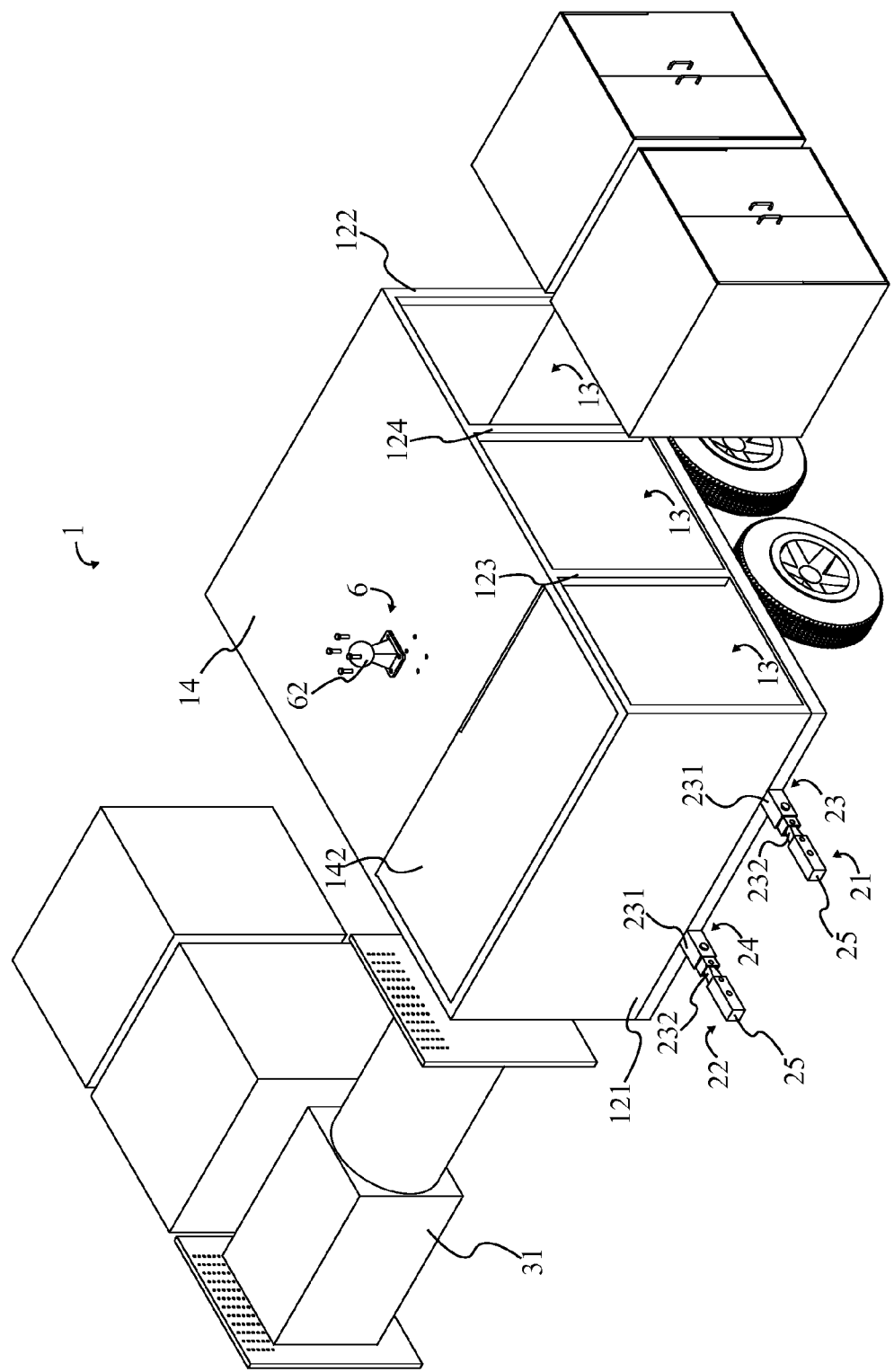
FIG. 5 is another perspective view of the present invention, showing external storage containers and engine.
Figure 6:
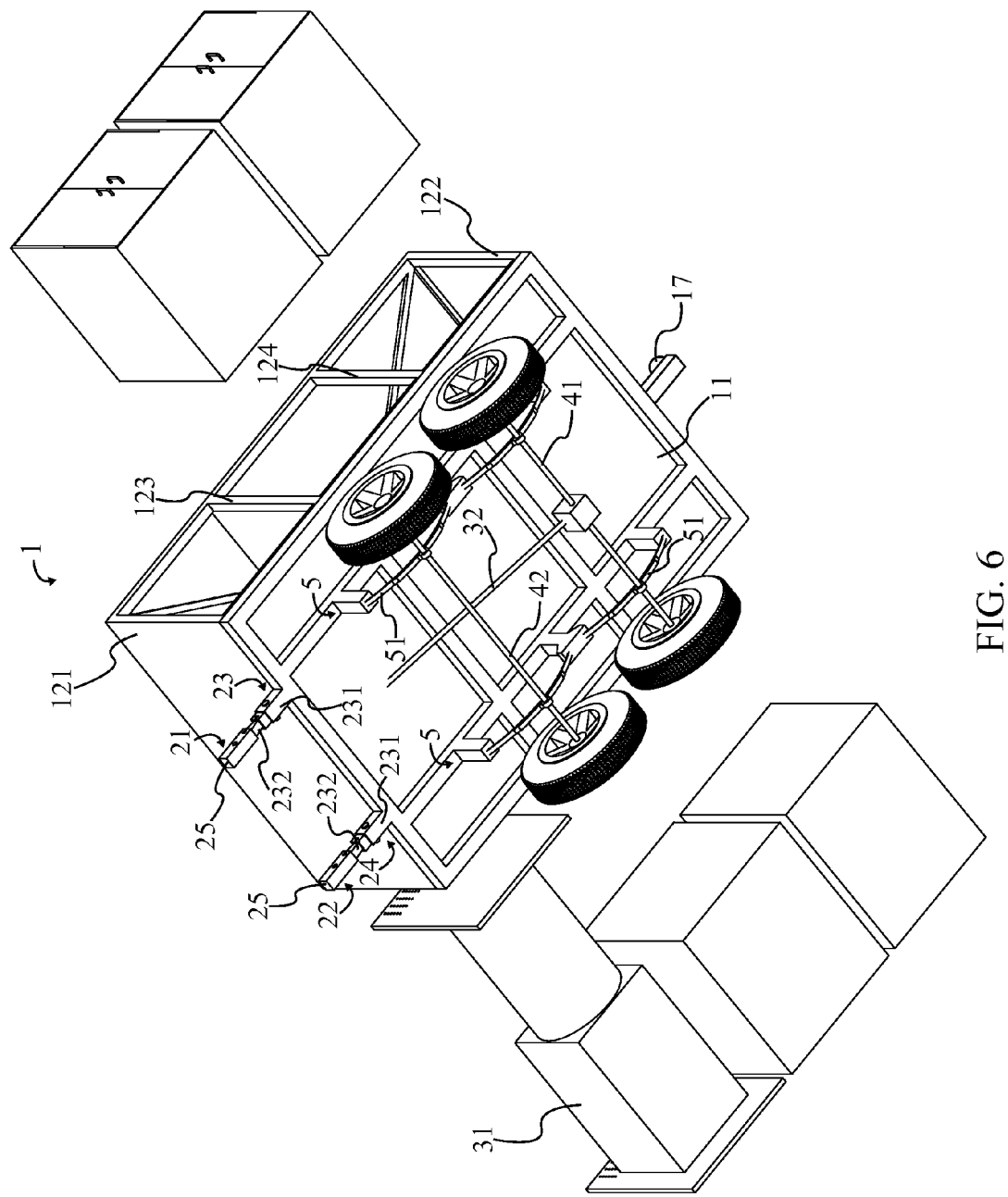
FIG. 6 is a bottom perspective view of the present invention, showing external storage containers, a drive train, and a wheel system.

The main body 1, visible in FIG. 1-FIG. 12, comprises a hollow base 11 a plurality of bulkhead 12, a plurality of storage compartments 13, a top cover 14, and a rear tow member 17. A plurality of pillars can be included to serve as additional support for the top cover 14; these pillars would be positioned around the perimeter of the hollow base 11, and be connected normal to the hollow base 11. The top cover 14 is connected atop the plurality of bulkheads 12 and is aligned with the hollow base 11. The main body 1 is divided into the plurality of storage compartments 13 by the plurality of bulkhead 12 as shown in FIG. 1 and FIG. 2, which are connected across the hollow base 11. Each of the storage compartments 13 are formed between adjacent bulkheads from the plurality of bulkhead 12. The plurality of bulkhead 12 comprises a front bulkhead 121, a rear bulkhead 122, a first interior bulkhead 123, and a second interior bulkhead 124, while the plurality of storage compartments 13 comprises an engine compartment 131, a center compartment 132, and a rear compartment 133. The plurality of bulkheads 12 and the plurality of storage compartments 13 are alternately positioned along the hollow base 11, such that the engine compartment 131 is positioned between the front bulkhead 121 and first interior bulkhead 123, the center compartment 132 is positioned between the first interior bulkhead 123 and the second interior bulkhead 124, and the rear compartment 133 is positioned between the second interior bulkhead 124 and the rear bulkhead 122. This arrangement is visualized in FIG. 4-FIG. 6. A first auxiliary bulkhead 15 second auxiliary bulkhead 16 is perpendicularly connected between the first interior bulkhead 123 and the second interior bulkhead 124, while a second auxiliary bulkhead 16 is perpendicularly connected between the second interior bulkhead 124 and the rear bulkhead 122. The first auxiliary bulkhead 15 and the second auxiliary bulkhead 16 bisect the center compartment 132 and the rear compartment 133. Respectively, these auxiliary bulkheads create a left section 134 and a right section 135 for the center compartment 132 and rear compartment 133. Ultimately, each of the plurality of storage compartments 13 is delineated by the hollow base 11, the top cover 14, and the adjacent bulkhead 12.

Figure 7:
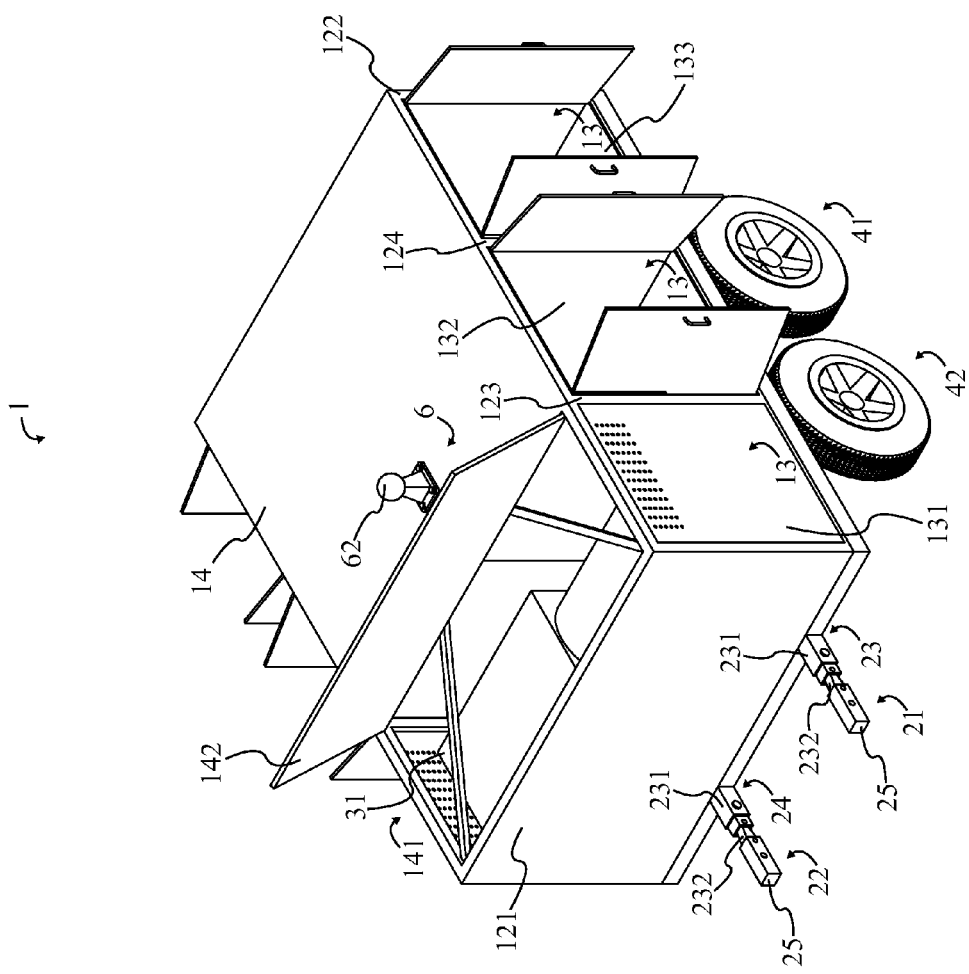
FIG. 7 is a top perspective view plan of the present invention, showing an open top cover.
Figure 8:
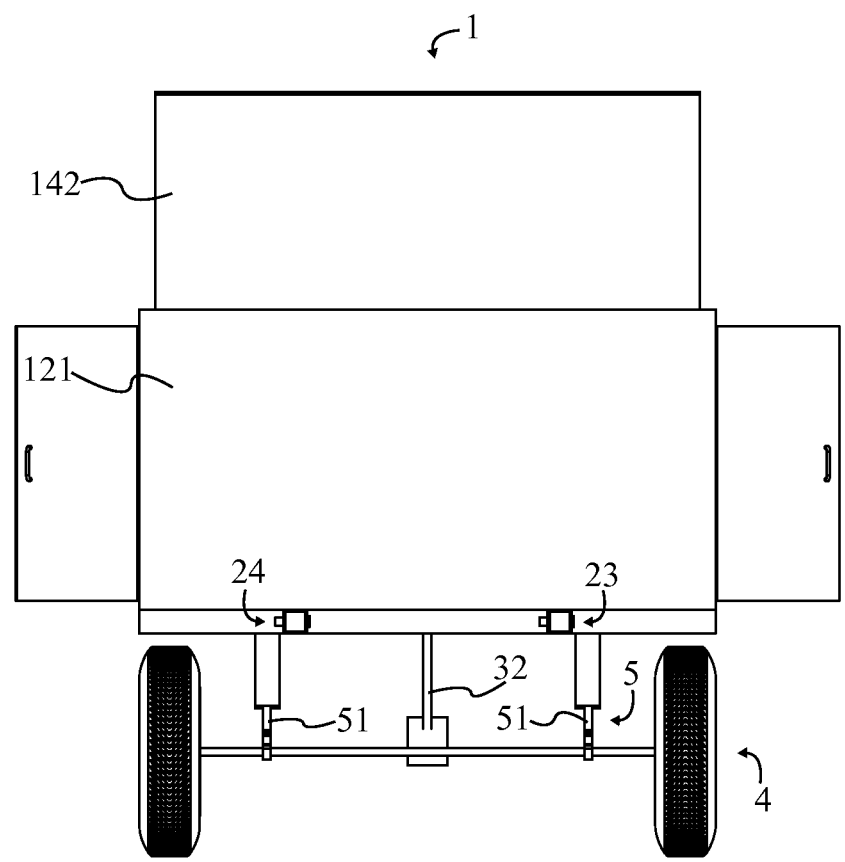
FIG. 8 is a front view of the present invention, showing an open top cover.
Figure 9:
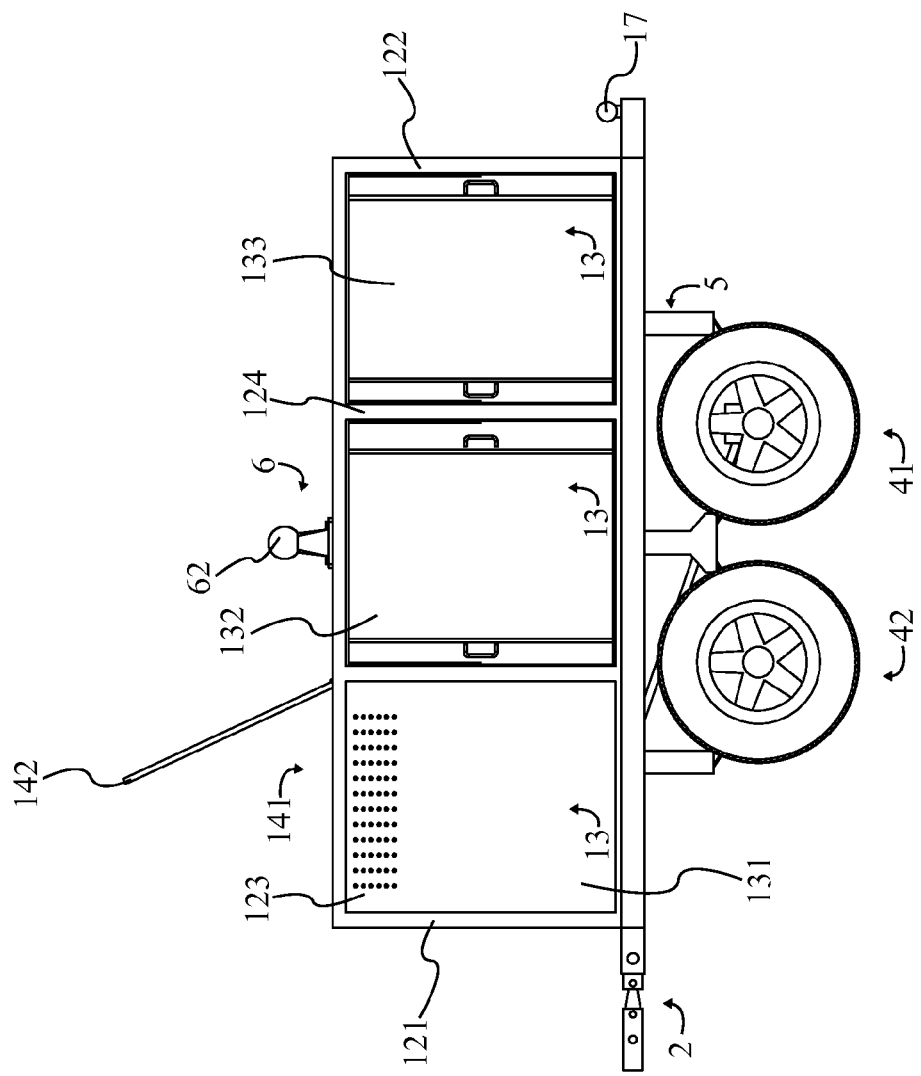
FIG. 9 is a side view of the present invention, showing an open top cover.
Figure 10:
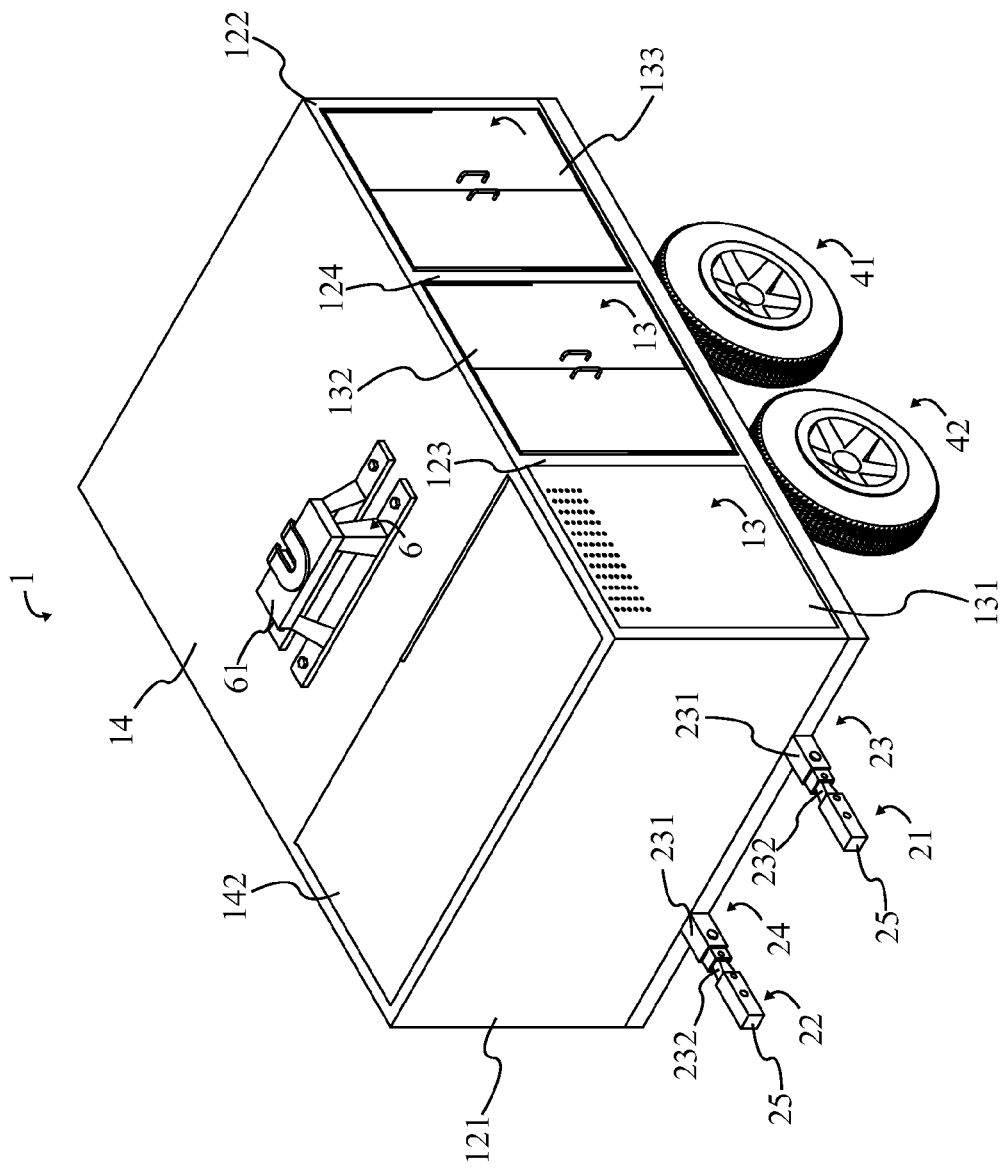
FIG. 10 is a top perspective view of the present invention, showing a fifth wheel coupling.
Figure 11:
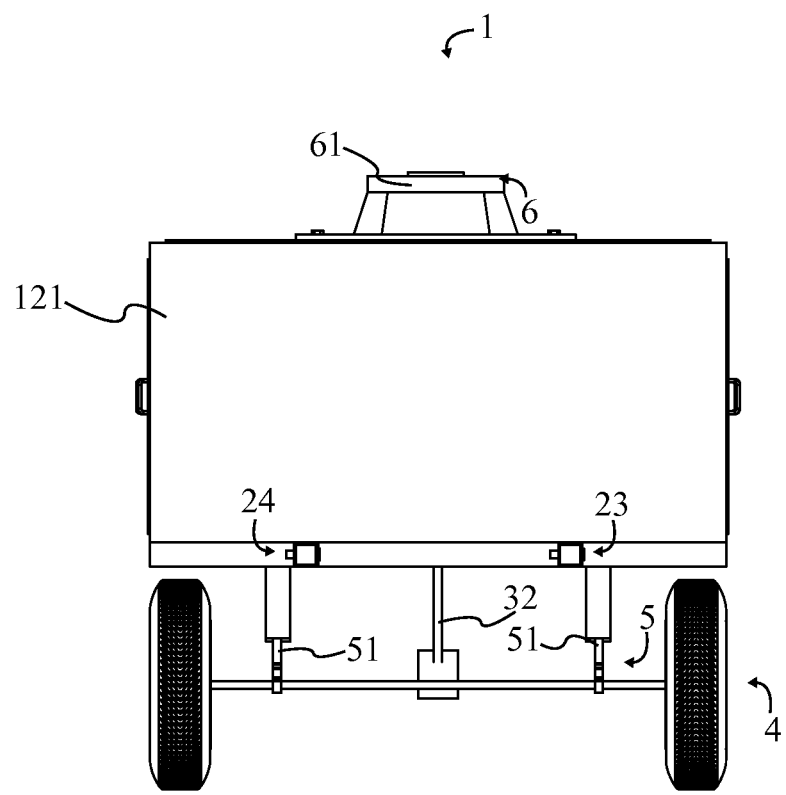
FIG. 11 is a front view of the present invention, showing a fifth wheel coupling.
Figure 12:
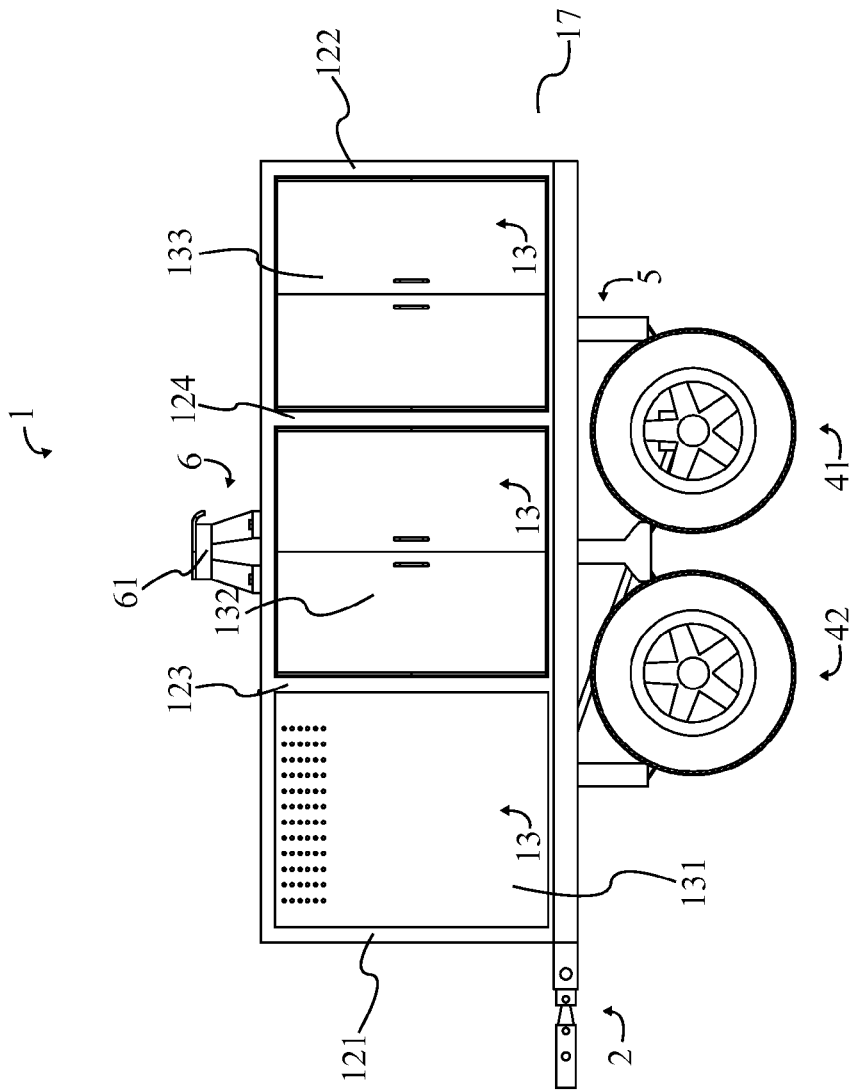
FIG. 12 is a side view of the present invention, showing a fifth wheel coupling.

To allow access to the engine compartment 131 and the front compartment 132, the top cover 14 comprises an engine access hole 141 and an adjustable lid 142, as illustrated in FIG. 7. To allow access to the aforementioned compartments 13, the engine access hole 141 is aligned with and positioned above the engine compartment 131 while the tow mount 7 is aligned with and positioned above the center compartment 132. The adjustable lid 142 is hingedly connected to the top cover 14 and positioned above the engine access hole 141. This configuration allows the adjustable lid 142 to cover the engine access hole 141 during regular use, protecting the engine compartment 131 from the elements and other debris. If the engine compartment 131 needs to be accessed, the adjustable lid 142 can simply be rotated about the hinged connection, providing access to the engine compartment 131 through the engine access hole 141.

The storage compartments 13 house key components of the present invention, such as from the power train 3 and tow mount hitch 6, as well as provide storage for further accessory components or cargo. The storage compartments 13 can be sealed off with a door or similar covering, helping to protect and secure cargo while the present invention is in use. Potentially, other embodiments can utilize removable containers which are sized to fit into the storage compartments 13 and help in place using a latch or similar securing mechanism.

In order to secure the present invention to a lead vehicle 7, the vehicle attachment system 2 is connected to the main body 1, positioned adjacent to the front bulkhead 121. Shown in FIG. 1-FIG. 12, in one embodiment the vehicle attachment system 2 comprises a first trailer tongue 21, a second trailer tongue 22, a first tow member 23, and a second tow member 24. The first trailer tongue 21 and the second trailer tongue 22, which are connected to the main body 1, each comprise an elongated body 231, ball hitch receptacle 233, ball hitch receptacle 233, and a connection rod 232. The connection rod 232 is positioned at a free end of the elongated body 231, opposite the main body 1.

The components of the first trailer tongue 21 and the second trailer tongue 22 are intended to enable coupling of the present invention to a lead vehicle 7. Provided as a connection point for this purpose are the first tow member 23 and second tow member 24, which are connected to the rear of the lead vehicle 7 and designed to interface with the first trailer tongue 21 and second trailer tongue 22, respectively. In the first embodiment the first tow member 23 and the second tow member 24 are a drawbar 25, which itself comprises a connector receptacle 251. The first trailer tongue 21 and the second trailer tongue 22 are coupled to the first tow member 23 and the second tow member 24 by securing the connection rod 232 to the connector receptacle 251. The drawbar 25 embodiment extends the effective length of the present invention and coupled lead vehicle 7.

Figure 15:
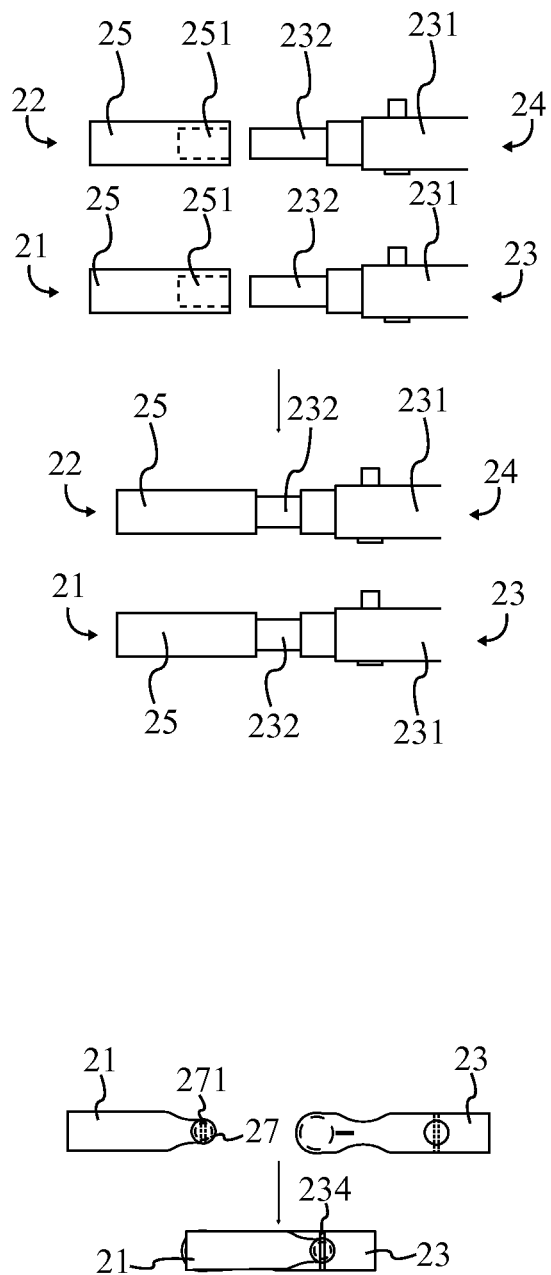
FIG. 15 is a top view plan showing the attachment components of the present invention.

In another embodiment, as seen in FIG. 15, the vehicle attachment system 2 comprises a first trailer tongue 21, a first tow member 23, and a latching mechanism 26. The first trailer tongue comprises an elongated body 231 and a ball hitch receptacle 233, the latter being positioned on the former. In this other embodiment, the first tow member 23 is a ball hitch 27, which comprises a pin receptacle 271. The latching mechanism 26, which comprises a pin lock 234, is used to help lock the ball hitch 27 in relation to the ball hitch receptacle 233. This pin receptacle 271 allows the pin lock 234 to be inserted through the pin receptacle 271 and the elongated body 231, preventing pivoting of the ball hitch 27. The pin lock 234 is electronically controlled, through a solenoid in the preferred embodiment, allowing a user to remotely enable or disable the pivoting function of the ball hitch 27. Disabling the pivoting capability of the ball hitch 27 prevents the present invention from turning relative to the lead vehicle 7, which simplifies backing up when a trailer is coupled to the tow mount hitch 6 of the present invention.

Figure 13:
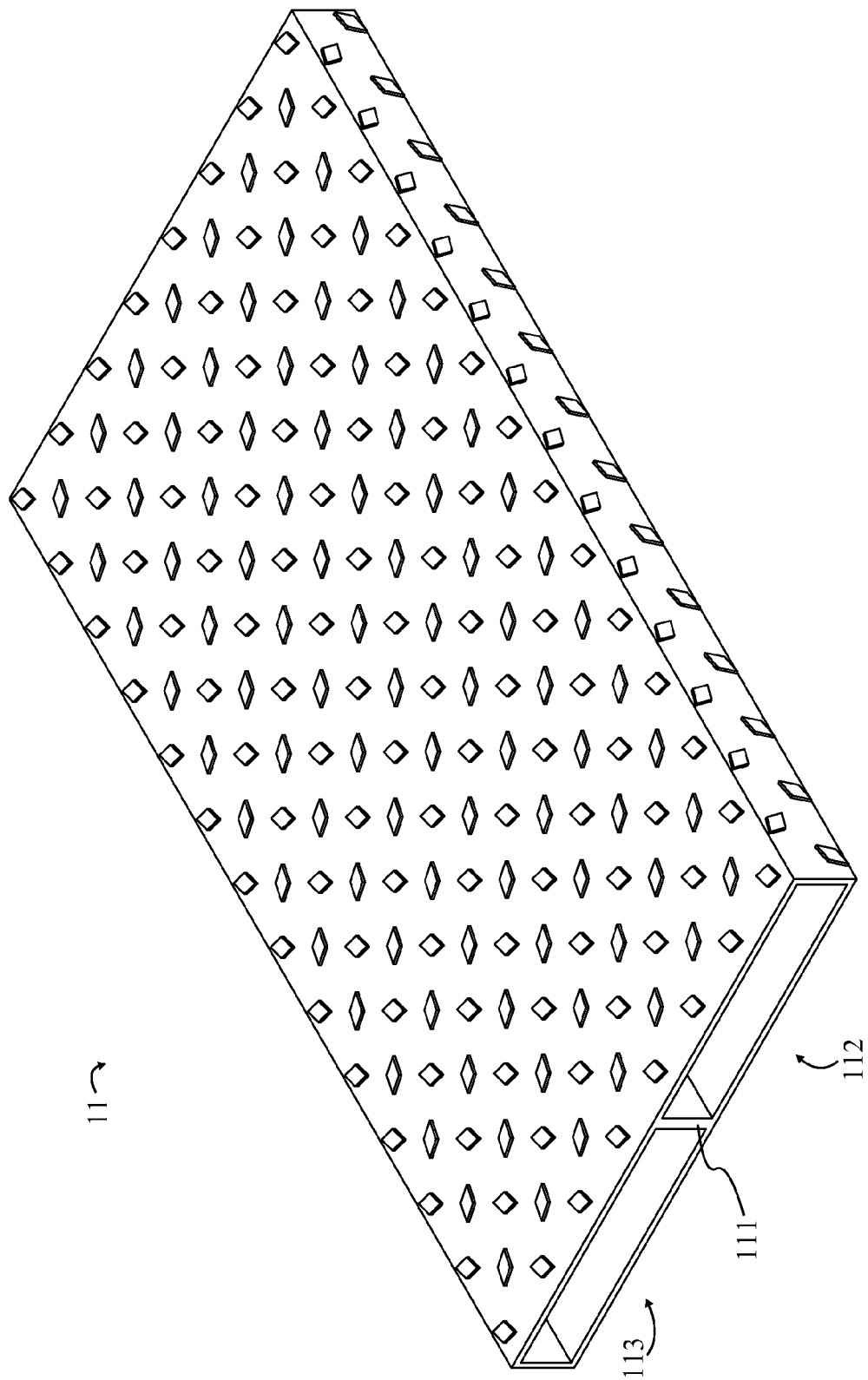
FIG. 13 is a perspective view plan of the hollow base of the present invention.

The hollow base 11 of the present invention, preferably of a diamond plate steel construction and rectangular shape, provides additional storage capacity to the present invention. A structural center channel 111 is integrated into the hollow base 11, positioned along the length of the hollow base 11. This center channel 111 divides the hollow base 11 into two sections, specifically a left compartment 112 and a right compartment 113. In the preferred embodiment, these sections are used to store fuel and water. These stored fluids can be used to extend the range or duration of an expedition, or alternately be kept as emergency reserves. This preferred hollow base 11 is depicted in FIG. 13.

The power train 3 of the present invention comprises an engine 31 and a transmission 32, while the wheel system 4 comprises a drive axle 41 and a free axle 42. The engine 31 is housed in the engine compartment 131 and provides the necessary power to rotate the drive axle 41. The drive axle 41 and free axle 42 are positioned beneath the hollow plate where they support the main body 1 of the present invention. The drive axle 41 and free axle 42 are connected to the main body 1 by means of the suspension 5, which is a leaf spring suspension 51 in the preferred embodiment. In order to allow the power train 3 and wheel system 4 to interact with each other, the engine 31 is operatively connected to the transmission 32, which itself is operatively connected to the drive axle 41. The resulting configuration allows the power to be transmitted from the engine 31 to the ground, by means of the transmission 32 and drive axle 41.

Potentially, in other embodiments, the engine 31 could be replaced with an alternative power source, such as using electric power or turbine power. Similarly, for off road purposes, the wheel system 4 may comprise an additional drive axle 41 as part of an all wheel drive embodiment. Further possibilities include the provision of more wheels for each axle and a different suspension 5, such as an air suspension. Further alterations and substitutions may be made to the power train 3, the wheel system 4, and the suspension 5 without detracting from the functionality of the present invention.

Figure 14:
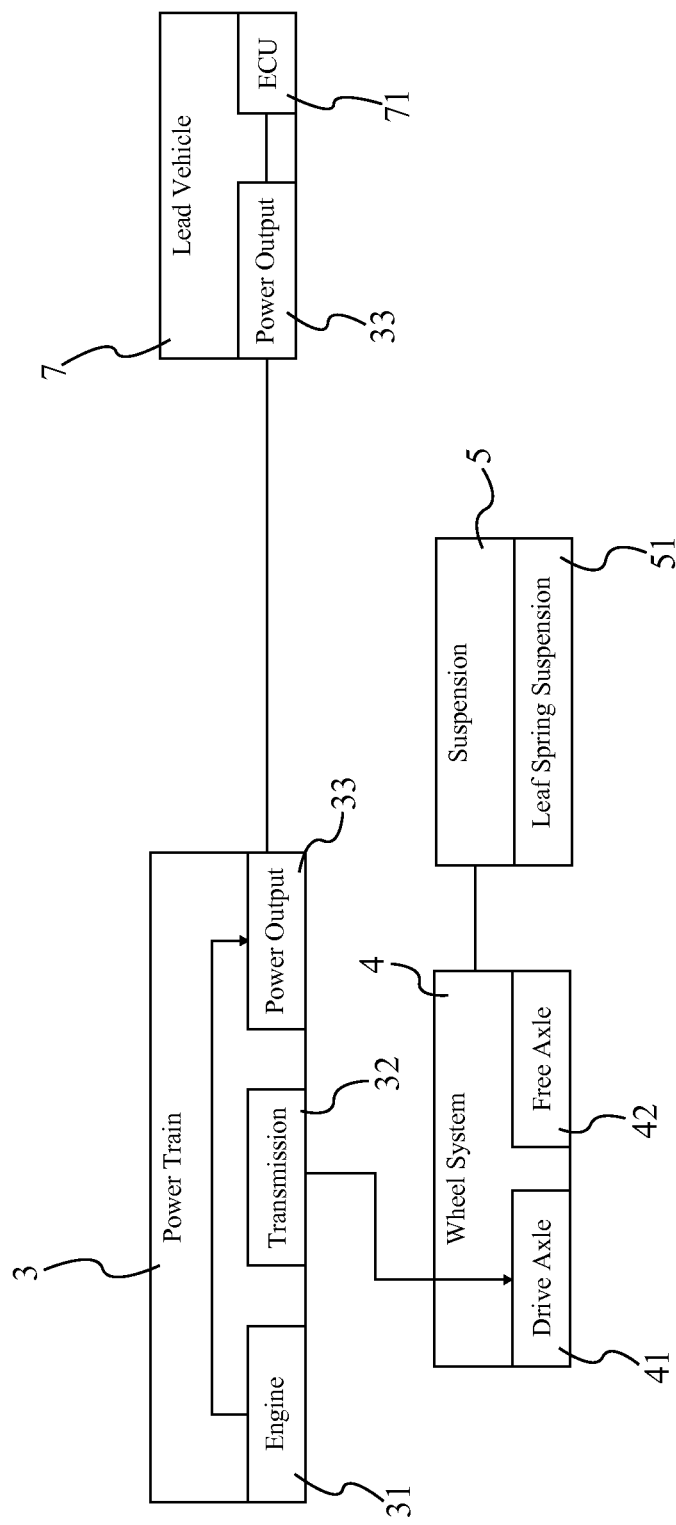
FIG. 14 is a diagram showing the relations between components of the present invention.

In order to match the speed of the present invention to that of the lead vehicle 7, the engine 31 communicates with the ECU 71. The communication between the ECU 71 and the engine 31 can be implemented through a wired connection or through wireless means, e.g. a Bluetooth connection. Matching power output 33 of the engine 31 and the lead vehicle 7 is important, as it ensures that the drive axle of the lead vehicle 7 and the drive axle 41 of the present invention apply the same power and rotate at the same speed, preventing any discrepancies that might result in an accident. To aid in matching the output of the engine 31 of the present invention to that of the lead vehicle 7, the transmission 32 comprises a gearbox which allows for shifting of gears in the engine 31. This allows for better torque matching, as well as speed matching, between the lead vehicle 7 ECU 71 and the engine 31 of the present invention. The relations between the components of the present invention and a lead vehicle 7 are outlined in FIG. 14.

The tow mount hitch 6, which is positioned outside the main body 1 and connected to the top cover 14 above the central compartment 132, serves as a connection point for trailers. The tow mount hitch 6 is positioned so that it is easily accessible to a trailer, which can be coupled to the main body 1 by means of the tow mount hitch 6. In the preferred embodiment, the tow mount hitch 6 is implemented as either a fifth wheel coupling 61 (FIG. 10-FIG. 12) or a gooseneck coupling 62 (FIG. 1, FIG. 3-FIG. 5, FIG. 7, and FIG. 9). These types of tow mount hitches 7 are not usually included on trucks, as they primarily used with commercial vehicles. Thus, the provision of a fifth wheel coupling 61 or gooseneck coupling 62 allows the present invention to be used by a lead vehicle 7 to tow a trailer or other load which the lead vehicle 7 otherwise lacks the necessary connection for.

In addition to the main tow mount hitch 6, a rear tow member 17 is connected to the main body 1 adjacent to the rear bulkhead 122. The rear tow member 17 provides a simpler coupling option for lighter loads that don't require use of the tow mount hitch 6. In the preferred embodiment the rear tow member 17 is a ball hitch type connection.

Although the invention has been explained in relation to its preferred embodiment, it is to be understood that many other possible modifications and variations can be made without departing from the spirit and scope of the invention as hereinafter claimed.

What is claimed is:

1. An all in one towing solution comprises:
    a main body;
    a vehicle attachment system;
    a power train;
    a wheel system;
    a suspension;
    a tow mount hitch;
    the vehicle attachment system being adjacently connected to the main body;
    the power train being housed within the main body;
    the wheel system being connected below the main body by the suspension;
    the power train being communicably coupled to an electronic control unit of a lead vehicle, wherein a power output of the power train is matched to the power output of the lead vehicle;
    the main body being coupled to the lead vehicle by the vehicle attachment system;
    the main body comprises a hollow base, a plurality of bulkheads, a plurality of storage compartments, a top cover, and a rear tow member; and
    the power train comprises an engine and a transmission.

2. The all in one towing solution as claimed in claim 1 further comprises:
    the vehicle attachment system comprises a first trailer tongue, a second trailer tongue, a first tow member, and a second tow member;
    the first trailer tongue and the second trailer tongue each comprise an elongated body and a connection rod;
    the connection rod being positioned opposite the main body along the elongated body;
    the first tow member and the second tow member each being a drawbar;
    the drawbar comprises a connector receptacle;
    the connection rod of the first trailer tongue traversing into the connector receptacle of the first tow member; and
    the connection rod of the second trailer tongue traversing into the connector receptacle of the second tow member.

3. The all in one towing solution as claimed in claim 1 further comprises:
    the vehicle attachment system comprises a first trailer tongue, a first tow member, and a latching mechanism;
    the first trailer tongue comprises an elongated body and a ball hitch receptacle;
    the latching mechanism comprises a pin lock;
    the ball hitch receptacle being positioned on the elongated body;
    the first tow member being a ball hitch;
    the ball hitch comprises a pin receptacle;
    the ball hitch of the first tow member being pivotably engaged with the ball hitch receptacle of the first trailer tongue; and
    the pin lock traversing through the pin receptacle, wherein the pin lock prevents the ball hitch from pivoting.

4. The all in one towing solution as claimed in claim 1 further comprises:
    the plurality of bulkheads being perpendicularly connected across the hollow base;
    the plurality of bulkheads and the plurality of storage compartments being alternately positioned along the hollow base;
    the top cover being connected to the plurality of bulkheads opposite the hollow base;
    the plurality of bulkheads comprises a front bulkhead, a rear bulkhead, a first interior bulkhead, and a second interior bulkhead;
    the plurality of storage compartments further comprises an engine compartment, a center compartment, and a rear compartment;
    the rear tow member being connected to the main body adjacent to the rear bulkhead;
    the engine being housed in the engine compartment; and
    the tow mount hitch being connected atop the top cover, wherein the tow mount hitch is selected from the group consisting of a fifth wheel coupling and a gooseneck coupling.

5. The all in one towing solution as claimed in claim 4 further comprises:
    the front bulkhead and the rear bulkhead being positioned opposite each other along the hollow base;
    the first interior bulkhead and the second interior bulkhead being positioned between the front bulkhead and the rear bulkhead;
    the engine compartment being positioned between the front bulkhead and the first interior bulkhead;

the center compartment being positioned between the first interior bulkhead and the second interior bulkhead;

the rear compartment being positioned between the second interior bulkhead and the rear bulkhead;

the center compartment and the rear compartment each comprise a left section and a right section;

the first auxiliary bulkhead being perpendicularly connected between the first interior bulkhead and the second interior bulkhead;

the first auxiliary bulkhead bisecting the center compartment;

the left section of the center compartment and the right section of the center compartment being positioned opposite each other across the first auxiliary bulkhead;

the second auxiliary bulkhead being perpendicularly connected between the second interior bulkhead and the rear bulkhead;

the second auxiliary bulkhead bisecting the rear compartment; and the left section of the rear compartment and the right section of the rear compartment being positioned opposite each other across the second auxiliary bulkhead.

6. The all in one towing solution as claimed in claim 4 further comprises:

the top cover comprises an engine access hole and an adjustable lid;

the engine access hole being positioned above the engine compartment;

the adjustable lid being positioned above the front access hole; and the adjustable lid being hingedly connected to the top cover.

7. The all in one towing solution as claimed in claim 1 further comprises:

the hollow base comprises a center channel, a left compartment, and a right compartment;

the center channel being positioned along the hollow base;

the center channel bisecting the hollow base; and the left compartment and the right compartment being positioned opposite each other across the center channel.

8. The all in one towing solution as claimed in claim 1 further comprises:

the wheel system comprises a drive axle and a free axle;

the engine being operatively coupled to the transmission;

the transmission being operatively coupled to the drive axle; and the drive axle and the rear axle being operatively coupled to the suspension, wherein the suspension is a leaf spring suspension.

9. An all in one towing solution trailer comprises:

a main body;

a vehicle attachment system;

a power train;

a wheel system;

a suspension;

a tow mount hitch;

the vehicle attachment system being adjacently connected to the main body;

the power train being housed within the main body;

the wheel system being connected below the main body by the suspension;

the power train being communicably coupled to an electronic control unit of a lead vehicle, wherein a power output of the power train is matched to the power output of the lead vehicle;

the main body being coupled to the lead vehicle by the vehicle attachment system;

the main body comprises a hollow base, a plurality of bulkheads, a plurality of storage compartments, a top cover, and a rear tow member;

the plurality of storage compartments further comprises an engine compartment, a center compartment, and a rear compartment;

the power train comprises an engine and a transmission;

the wheel system comprises a drive axle and a free axle;

the engine being operatively coupled to the transmission;

the transmission being operatively coupled to the drive axle; and the drive axle and the rear axle being operatively coupled to the suspension, wherein the suspension is a leaf spring suspension.

10. The all in one towing solution as claimed in claim 9 further comprises:

the vehicle attachment system comprises a first trailer tongue, a second trailer tongue, a first tow member, and a second tow member;

the first trailer tongue and the second trailer tongue each comprise an elongated body and a connection rod;

the connection rod being positioned opposite the main body along the elongated body;

the first tow member and the second tow member each being a drawbar;

the drawbar comprises a connector receptacle;

the connection rod of the first trailer tongue traversing into the connector receptacle of the first tow member; and the connection rod of the second trailer tongue traversing into the connector receptacle of the second tow member.

11. The all in one towing solution as claimed in claim 9 further comprises:

the vehicle attachment system comprises a first trailer tongue, a first tow member, and a latching mechanism;

the first trailer tongue comprises an elongated body and a ball hitch receptacle;

the latching mechanism comprises a pin lock;

the ball hitch receptacle being positioned on the elongated body;

the first tow member being a ball hitch;

the ball hitch comprises a pin receptacle;

the ball hitch of the first tow member being pivotably engaged with the ball hitch receptacle of the first trailer tongue; and the pin lock traversing through the pin receptacle, wherein the pin lock prevents the ball hitch from pivoting.

12. The all in one towing solution as claimed in claim 9 further comprises:

the plurality of bulkheads being perpendicularly connected across the hollow base;

the plurality of bulkheads and the plurality of storage compartments being alternately positioned along the hollow base;

the top cover being connected to the plurality of bulkheads opposite the hollow base;

the plurality of bulkheads comprises a front bulkhead, a rear bulkhead, a first interior bulkhead, and a second interior bulkhead;

the rear tow member being connected to the main body adjacent to the rear bulkhead;

the engine being housed in the engine compartment; and the tow mount hitch being connected atop the top cover, wherein the tow mount hitch is selected from the group consisting of a fifth wheel coupling and a gooseneck coupling.

13. The all in one towing solution as claimed in claim 9 further comprises:
   the front bulkhead and the rear bulkhead being positioned opposite each other along the hollow base;
   the first interior bulkhead and the second interior bulkhead being positioned between the front bulkhead and the rear bulkhead;
   the front compartment being positioned between the front bulkhead and the first interior bulkhead;
   the rear compartment being positioned between the second interior bulkhead and the rear bulkhead;
   the center compartment and the rear compartment each comprise a left section and a right section;
   the first auxiliary bulkhead being perpendicularly connected between the first interior bulkhead and the second interior bulkhead;
   the first auxiliary bulkhead bisecting the center compartment;
   the left section of the center compartment and the right section of the center compartment being positioned opposite each other across the first auxiliary bulkhead;
   the second auxiliary bulkhead being perpendicularly connected between the second interior bulkhead and the rear bulkhead;
   the second auxiliary bulkhead bisecting the rear compartment; and
   the left section of the rear compartment and the right section of the rear compartment being positioned opposite each other across the second auxiliary bulkhead.

14. The all in one towing solution as claimed in claim 9 further comprises:
   the top cover comprises an engine access hole and an adjustable lid;
   the engine access hole being positioned above the engine compartment;
   the adjustable lid being positioned above the front access hole; and
   the adjustable lid being hingedly connected to the top cover.

15. The all in one towing solution as claimed in claim 9 further comprises:
   the hollow base comprises a center channel, a left compartment, and a right compartment;
   the center channel being positioned along the hollow base;
   the center channel bisecting the hollow base; and
   the left compartment and the right compartment being positioned opposite each other across the center channel.

16. An all in one towing solution trailer comprises:
   a main body;
   a vehicle attachment system;
   a power train;
   a wheel system;
   a suspension;
   a tow mount hitch;
   the vehicle attachment system being adjacently connected to the main body;
   the power train being housed within the main body;
   the wheel system being connected below the main body by the suspension;
   the power train being communicably coupled to an electronic control unit of a lead vehicle, wherein a power output of the power train is matched to the power output of the lead vehicle;
   the main body being coupled to the lead vehicle by the vehicle attachment system;
   the main body comprises a hollow base, a plurality of bulkheads, a plurality of storage compartments, a top cover, and a rear tow member;
   the plurality of storage compartments further comprises an engine compartment, a center compartment, and a rear compartment;
   the power train comprises an engine and a transmission;
   the wheel system comprises a drive axle and a free axle;
   the engine being operatively coupled to the transmission;
   the transmission being operatively coupled to the drive axle;
   the drive axle and the rear axle being operatively coupled to the suspension, wherein the suspension is a leaf spring suspension;
   the plurality of bulkheads being perpendicularly connected across the hollow base;
   the plurality of bulkheads and the plurality of storage compartments being alternately positioned along the hollow base;
   the front bulkhead and the rear bulkhead being positioned opposite each other along the hollow base; and
   the first interior bulkhead and the second interior bulkhead being positioned between the front bulkhead and the rear bulkhead.

17. The all in one towing solution as claimed in claim 16 further comprises:
   the vehicle attachment system comprises a first trailer tongue, a second trailer tongue, a first tow member, and a second tow member;
   the first trailer tongue and the second trailer tongue each comprise an elongated body and a connection rod;
   the connection rod being positioned opposite the main body along the elongated body;
   the first tow member and the second tow member each being a drawbar;
   the drawbar comprises a connector receptacle;
   the connection rod of the first trailer tongue traversing into the connector receptacle of the first tow member; and
   the connection rod of the second trailer tongue traversing into the connector receptacle of the second tow member.

18. The all in one towing solution as claimed in claim 16 further comprises:
   the vehicle attachment system comprises a first trailer tongue, a first tow member, and a latching mechanism;
   the first trailer tongue comprises an elongated body and a ball hitch receptacle;
   the latching mechanism comprises a pin lock;
   the ball hitch receptacle being positioned on the elongated body;
   the first tow member being a ball hitch;
   the ball hitch comprises a pin receptacle;
   the ball hitch of the first tow member being pivotably engaged with the ball hitch receptacle of the first trailer tongue; and
   the pin lock traversing through the pin receptacle, wherein the pin lock prevents the ball hitch from pivoting.

19. The all in one towing solution as claimed in claim 16 further comprises:
   the top cover being connected to the plurality of bulkheads opposite the hollow base;
   the plurality of bulkheads comprises a front bulkhead, a rear bulkhead, a first interior bulkhead, and a second interior bulkhead;
   the rear tow member being connected to the main body adjacent to the rear bulkhead;
   the engine being housed in the engine compartment;

the tow mount hitch being connected atop the top cover, wherein the tow mount hitch is selected from the group consisting of a fifth wheel coupling and a gooseneck coupling;

the front compartment being positioned between the front bulkhead and the first interior bulkhead;

the rear compartment being positioned between the second interior bulkhead and the rear bulkhead;

the center compartment and the rear compartment each comprise a left section and a right section;

the first auxiliary bulkhead being perpendicularly connected between the first interior bulkhead and the second interior bulkhead;

the first auxiliary bulkhead bisecting the center compartment;

the left section of the center compartment and the right section of the center compartment being positioned opposite each other across the first auxiliary bulkhead;

the second auxiliary bulkhead being perpendicularly connected between the second interior bulkhead and the rear bulkhead;

the second auxiliary bulkhead bisecting the rear compartment; and the left section of the rear compartment and the right section of the rear compartment being positioned opposite each other across the second auxiliary bulkhead.

20. The all in one towing solution as claimed in claim 16 further comprises:

the top cover comprises an engine access hole and an adjustable lid;

the engine access hole being positioned above the engine compartment;

the adjustable lid being positioned above the front access hole;

the adjustable lid being hingedly connected to the top cover;

the hollow base comprises a center channel, a left compartment, and a right compartment;

the center channel being positioned along the hollow base;

the center channel bisecting the hollow base; and the left compartment and the right compartment being positioned opposite each other across the center channel.

\* \* \* \* \*